(12) United States Patent
Vora

(10) Patent No.: US 12,134,407 B2
(45) Date of Patent: Nov. 5, 2024

(54) PREDICTING A PARKING OR PULLOVER SPOT VACANCY FOR AN AUTONOMOUS VEHICLE PICKUP

(71) Applicant: Waymo LLC, Mountain View, CA (US)

(72) Inventor: Mishika Vora, Hayward, CA (US)

(73) Assignee: Waymo LLC, Mountain View, CA (US)

( * ) Notice: Subject to any disclaimer, the term of this patent is extended or adjusted under 35 U.S.C. 154(b) by 259 days.

(21) Appl. No.: 17/339,421

(22) Filed: Jun. 4, 2021

(65) Prior Publication Data

US 2022/0388546 A1    Dec. 8, 2022

(51) Int. Cl.
*B60W 60/00* (2020.01)
*G06V 20/58* (2022.01)
*G08G 1/01* (2006.01)
*G08G 1/14* (2006.01)

(52) U.S. Cl.
CPC ..... *B60W 60/00253* (2020.02); *G06V 20/584* (2022.01); *G08G 1/0129* (2013.01); *G08G 1/146* (2013.01)

(58) Field of Classification Search
CPC ....... B60W 60/00253; B60W 2552/53; B60W 60/0027; B60W 2554/80; B60W 60/0011; G06V 20/584; G06V 20/58; G08G 1/0129; G08G 1/146; G08G 1/205
See application file for complete search history.

(56) References Cited

U.S. PATENT DOCUMENTS

| | | | |
|---|---|---|---|
| 10,520,941 B2 | 12/2019 | Herbach et al. | |
| 2016/0358473 A1* | 12/2016 | Scofield | G08G 1/0129 |
| 2017/0243487 A1* | 8/2017 | Levy | G08G 1/012 |
| 2017/0267233 A1* | 9/2017 | Minster | G06Q 10/02 |
| 2017/0329346 A1* | 11/2017 | Latotzki | G05D 1/0291 |
| 2018/0229724 A1* | 8/2018 | Gutmann | G01S 15/931 |

(Continued)

OTHER PUBLICATIONS

Bischoff, J., et al., Autonomous vehicles and their impact on parking search, IEEE Intelligent Transportation Systems, 2018, pp. 1-9.

(Continued)

*Primary Examiner* — James J Lee
*Assistant Examiner* — Alexander George Matta
(74) *Attorney, Agent, or Firm* — Botos Churchill IP Law LLP

(57) ABSTRACT

The technology involves to pickups performed by autonomous vehicles. In particular, it includes identifying one or more potential pullover locations adjacent to an area of interest that an autonomous vehicle is approaching. The vehicle detects that a given one of the potential pullover locations is occupied by another vehicle and determines whether the other vehicle will be vacating the given pullover location within a selected amount of time. Upon determining that the other vehicle will be vacating the given potential pullover location within the timeframe, the vehicle determines whether to wait for the other vehicle to vacate the (Continued)

given pullover location. Then a driving system of the vehicle either performs a first action in order to wait for the other vehicle to vacate the given pullover location or performs a second action that is different from the first action when it is determined to not wait.

23 Claims, 14 Drawing Sheets

(56) References Cited

U.S. PATENT DOCUMENTS

| | | | |
|---|---|---|---|
| 2019/0111916 A1* | 4/2019 | Lee | G05D 1/0088 |
| 2019/0353495 A1 | 11/2019 | Dyer et al. | |
| 2020/0097007 A1* | 3/2020 | Dyer | B60W 40/04 |
| 2020/0111370 A1* | 4/2020 | Dyer | G05D 1/0214 |
| 2020/0160708 A1* | 5/2020 | Kamiya | G06V 20/53 |
| 2020/0172089 A1 | 6/2020 | Dyer et al. | |
| 2020/0254997 A1* | 8/2020 | Mueller | B62D 15/0285 |
| 2020/0326194 A1 | 10/2020 | Wang et al. | |
| 2020/0409363 A1* | 12/2020 | Gogna | G05D 1/0276 |
| 2021/0216074 A1* | 7/2021 | Dyer | G08G 1/0145 |

OTHER PUBLICATIONS

Bonde, D.J., et al., Automated Car Parking System Commanded by Android Application, International Journal of Computer Science and Information Technologies, vol. 5(3), 2014, pp. 3001-3004.

Delot, Thierry, et al., Sharing with caution: Managing parking spaces in vehicular networks, Mobile Information Systems 9 (2013) 69-98.

Dolgov, Dmitri, et al., Path Planning for Autonomous Vehicles in Unknown Semi-structured Environments, The International Journal of Robotics Research, vol. 29, No. 5, 2010, pp. 485-501.

Ferreira, Michael, et al., Self-automated parking lots for autonomous vehicles based on vehicular ad hoc networking Research Gate, 2014, pp. 1-9.

Idris, M.Y.I., et al., Car Park System: A Review of Smart Parking System and its Technology, Information Technology Journal 8(2): 2009, pp. 101-113.

Jermsurawong, Jermsak, et al., Car Parking Vacancy Detection and Its Application in 24-Hour Statistical Analysis, 2014, pp. 1-7.

Laurier, Eric, Searching for a parking space, Department of Geography & Geomatics, 2005, pp. 1-16.

Leonard, John, et al., A Perception-Driven Autonomous Urban Vehicle, Journal of Field Robotics, 2008, pp. 728-774.

Mathur, Suhas, ParkNet: Drive-by Sensing of Road-Side Parking Statistics, Mobisys, 2010, pp. 1-14.

Nourinejad, Mehdi, et al., Designing parking facilities for autonomous vehicles, Elsevier, ScienceDirect, Transportation Research Part B 109, 2018, pp. 110-127.

Saltzman, Robert, An Animated Simulation Model for Analyzing On-Street Parking Issues, Society for Modeling and Simulation International, 1997, pp. 1-14.

Wiseman, Yair, Self-Driving Car—A Computer will Park for You, Computer Science Dept. Bar-Ilan University, 2017, pp. 1-6.

\* cited by examiner

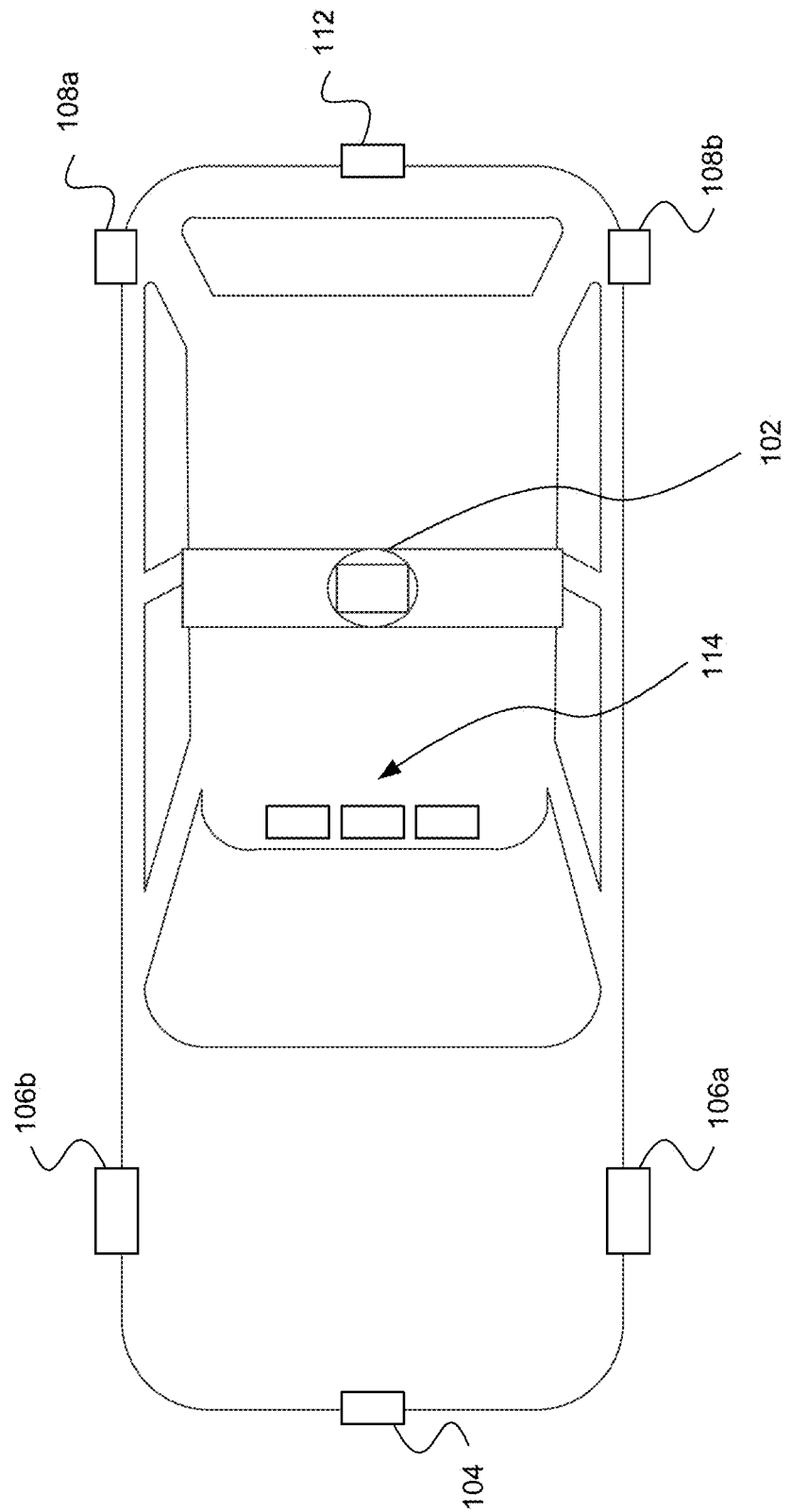

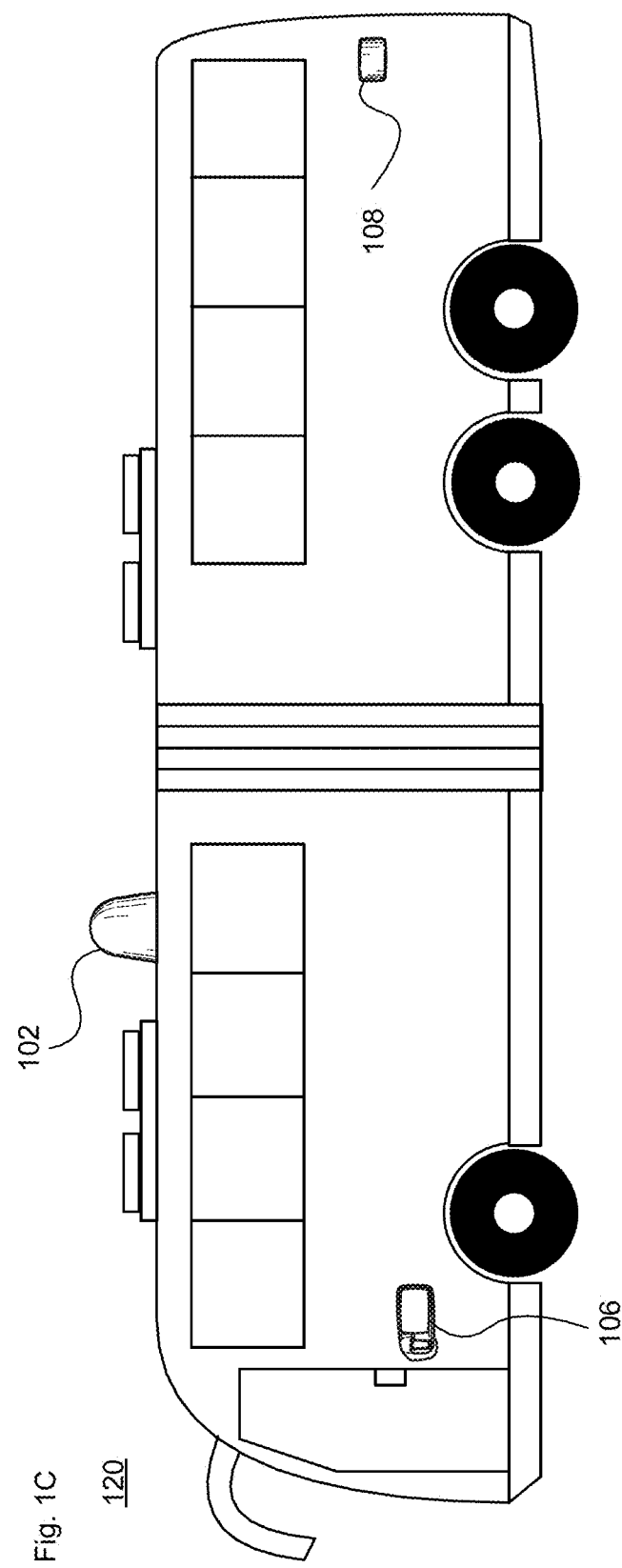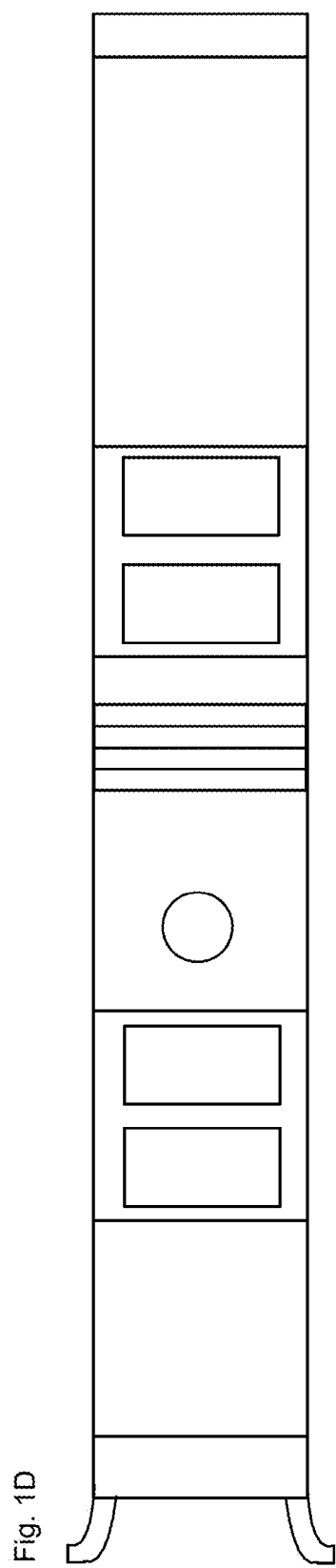

300

350

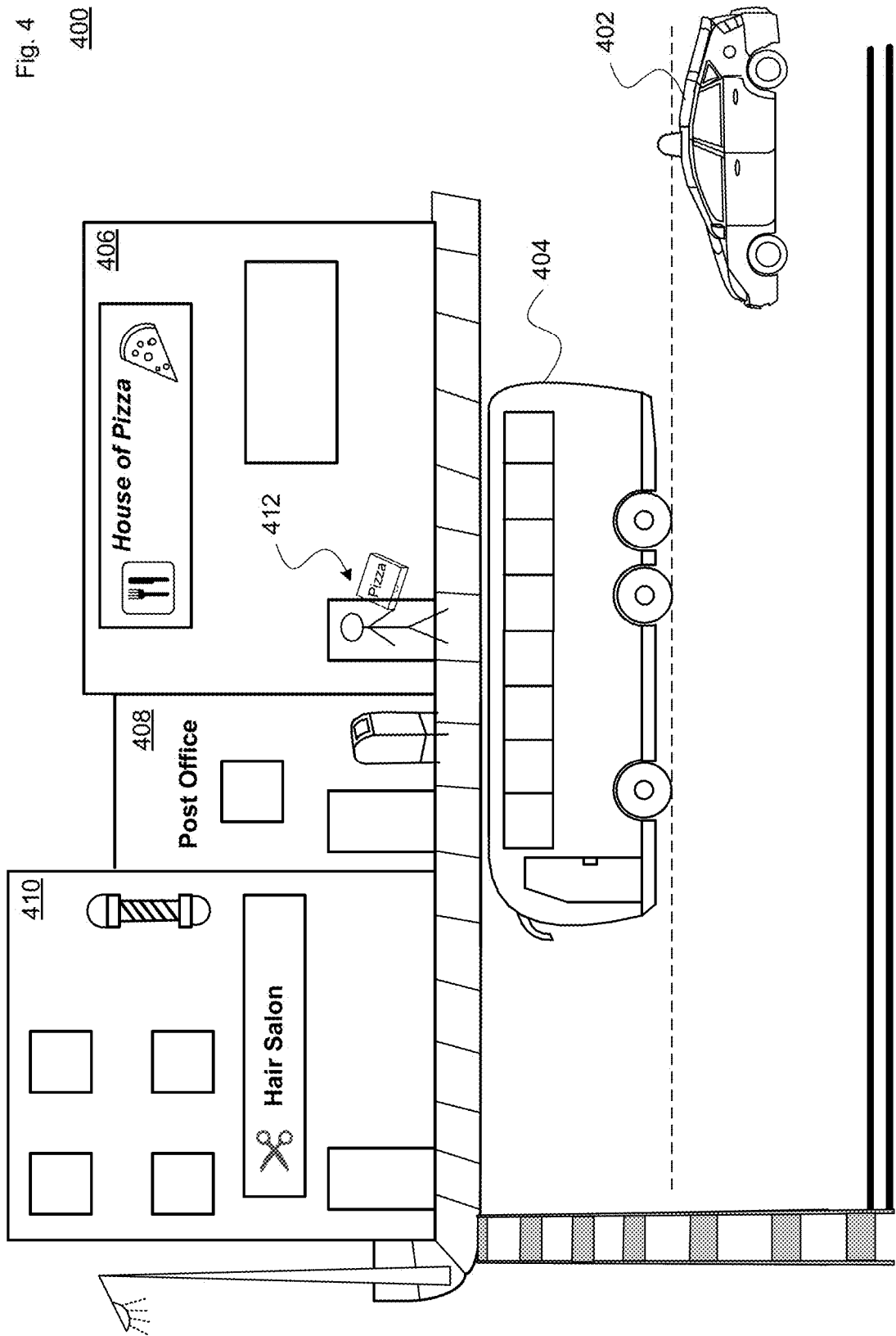

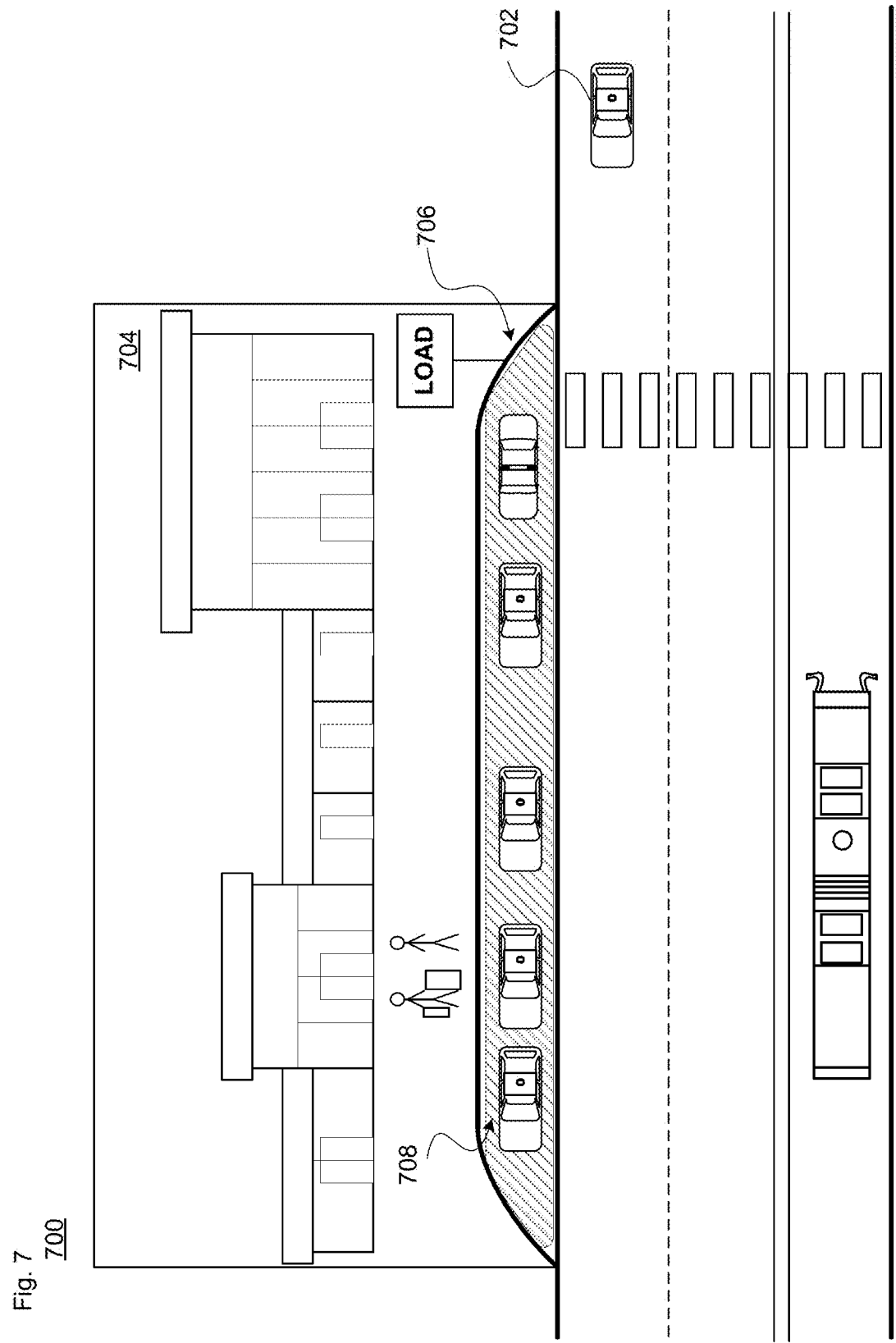

810

800

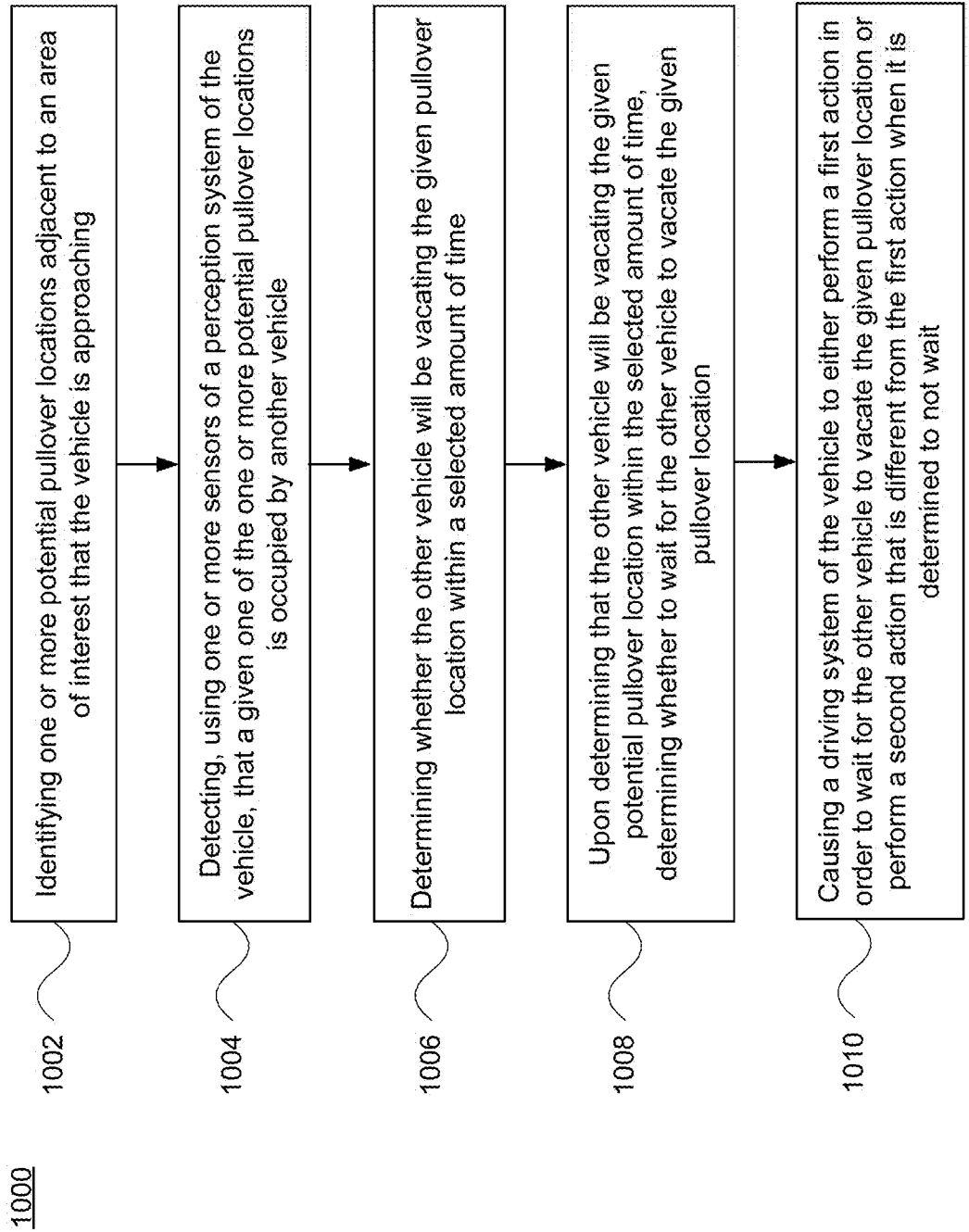

PREDICTING A PARKING OR PULLOVER SPOT VACANCY FOR AN AUTONOMOUS VEHICLE PICKUP

BACKGROUND

Autonomous vehicles, such as vehicles that do not require a human driver, can be used to aid in the transport of riders from one location to another. Such vehicles may operate in a fully autonomous mode without a person providing driving input. Picking up a rider or a package may be challenging for various reasons, for instance when there is heavy traffic or there are other vehicles parked in spots that are close to a selected pickup location.

BRIEF SUMMARY

The technology relates to pickups performed by autonomous vehicles. In particular, an autonomous vehicle evaluates signals from its perception system, along with other information, to determine that a car or other vehicle is leaving a temporary pullover spot. The autonomous vehicle can then wait to occupy that spot. This is especially beneficial in dense urban environments or other situations during busy times when there is limited parking. Upon detecting that another vehicle is leaving or will shortly leave the pullover spot, the autonomous vehicle can then decide to wait and pull over at the spot instead of pulling into another, suboptimal location. The decision to wait to pullover in the to-be freed spot can be analyzed against other available pullover spots.

According to one aspect, a computer-implemented method for a vehicle operating in an autonomous driving mode is provided. The method comprises identifying, by one or more processors of the vehicle, one or more potential pullover locations adjacent to an area of interest that the vehicle is approaching; detecting, using one or more sensors of a perception system of the vehicle, that a given one of the one or more potential pullover locations is occupied by another vehicle; determining, by the one or more processors, whether the other vehicle will be vacating the given pullover location within a selected amount of time; upon determining that the other vehicle will be vacating the given potential pullover location within the selected amount of time, the one or more processors determining whether to wait for the other vehicle to vacate the given pullover location; and the one or more processors causing a driving system of the vehicle to either perform a first action in order to wait for the other vehicle to vacate the given pullover location or perform a second action that is different from the first action when it is determined to not wait.

In one example, determining whether the other vehicle will be vacating the given pullover location within the selected amount of time includes evaluating one or more vehicle-related signals and at least one of a recently parked attribute of the other vehicle, information about the one or more potential pullover locations, historical parking information for the area of interest, contextual information associated with a nearby business, or contextual information associated with local real-time data. The one or more vehicle-related signals may be selected from the group consisting of: actuation of a turn signal, actuation of a hazard signal, illumination of a brake light, a wheel angle, whether a door of the other vehicle is open, whether a trunk of the other vehicle is open, whether a person is sitting in a driver's seat of the other vehicle, and whether a passenger is present in the other vehicle. The information about the one or more potential pullover locations may include at least one of a configuration of the one or more potential pullover locations, parking signage, curb striping, parking pavement markings, presence of a parking meter, or presence of one or more construction or parking cones. The historical parking information for the area of interest may include at least one of time of day parking information, weekday parking restrictions weekend parking restrictions, holiday parking information, street cleaning information, or weather-related parking information. The contextual information associated with a nearby business may include business type information for one or more businesses located within a selected distance from the one or more potential pullover locations. The contextual information associated with local real-time data may include whether a person is approaching the other vehicle in the given pullover location.

Determining whether the other vehicle will be vacating the given pullover location within the selected amount of time may include assigning confidence values with different signals or attributes associated with either the other vehicle or the given pullover location. Here, the method may further comprise adjusting an overall confidence that the other vehicle will be vacating the given pullover location based upon whether two or more signals or attributes are complementary to one another.

Determining whether to wait for the other vehicle to vacate the given pullover location may include evaluating at least one of a time until the autonomous vehicle is scheduled to make a pickup, a maximum wait time, whether another parking spot is currently available, whether another parking spot will become available within a given amount of time, or an impact on one or more other road users. Here, the impact on one or more other road users may include an evaluation of inconvenience to the one or more other road users.

Determining whether to wait for the other vehicle to vacate the given pullover location may include identifying a maximum wait time based on a distance between the autonomous vehicle and another road user. Here, the method may further comprise adjusting the maximum wait time based on whether the other road user is in a same lane as the autonomous vehicle or a relative speed between the other road user and the autonomous vehicle.

The one or more potential pullover locations may comprise a set of parking spots. Or alternatively, the one or more potential pullover locations may comprise a loading zone or an unloading zone.

According to another aspect, a vehicle configured to operate in an autonomous driving mode is provided. The vehicle comprises a perception system, a driving system, a positioning system and a control system. The perception system includes one or more sensors configured to receive sensor data associated with objects in an external environment of the vehicle. The driving system includes a steering subsystem, an acceleration subsystem and a deceleration subsystem to control driving of the vehicle. The positioning system is configured to determine a current position of the vehicle. And the control system includes one or more processors. The control system is operatively coupled to the driving system, the perception system and the positioning system. The control system is configured to: identify one or more potential pullover locations adjacent to an area of interest that the vehicle is approaching; identify, based on signals from the one or more sensors of the perception system, that a given one of the one or more potential pullover locations is occupied by another vehicle; determine whether the other vehicle will be vacating the given pullover location within a selected amount of time; upon a determination that the other vehicle will be vacating the given potential pullover location within the selected amount of time, determine whether to wait for the other vehicle to vacate the given pullover location; and cause the driving system of the vehicle to either perform a first action in order to wait for the other vehicle to vacate the given pullover location or perform a second action that is different from the first action when it is determined to not wait.

In one example, the determination of whether the other vehicle will be vacating the given pullover location within the selected amount of time includes an evaluation of one or more vehicle-related signals and at least one of a recently parked attribute of the other vehicle, information about the one or more potential pullover locations, historical parking information for the area of interest, contextual information associated with a nearby business, or contextual information associated with local real-time data.

In another example, the determination of whether the other vehicle will be vacating the given pullover location within the selected amount of time includes assigning confidence values with different signals or attributes associated with either the other vehicle or the given pullover location.

In a further example, the determination of whether to wait for the other vehicle to vacate the given pullover location includes an evaluation of at least one of a time until the autonomous vehicle is scheduled to make a pickup, a maximum wait time, whether another parking spot is currently available, whether another parking spot will become available within a given amount of time, or an impact on one or more other road users.

And in yet another example, the determination of whether to wait for the other vehicle to vacate the given pullover location includes an identification of a maximum wait time based on a distance between the vehicle and another road user.

BRIEF DESCRIPTION OF THE DRAWINGS

FIGS. 1A-B illustrate an example passenger-type vehicle configured for use with aspects of the technology.

FIGS. 1C-D illustrate an example articulated bus arrangement for use with aspects of the technology.

FIG. 4 illustrates a pickup scenario in accordance with aspects of the technology.

FIG. 7 illustrates a loading zone pickup scenario in accordance with aspects of the technology.

FIG. 10 illustrates an example method in accordance with aspects of the technology.

DETAILED DESCRIPTION

One aspect of the technology involves detecting and/or classifying whether another vehicle is about to leave a spot that is nearby to a pickup location, where the autonomous vehicle may be picking up one or more passengers, or packages or other deliverables. The vehicle could be a car, a motorcycle, a delivery truck or other vehicle. Various signals detected by the autonomous vehicle's perception system or otherwise available to the onboard control system (e.g., detailed map data) may be used for the detection, classification or other determination. Another aspect involves deciding on whether the autonomous vehicle will wait for the spot to open up or look someplace else to park or temporarily pull over for a pickup. Here, even if it is determined that a vehicle will be vacating a spot shortly, traffic or other real-time environmental conditions may be weighed in a decision by the autonomous vehicle as to whether to wait for the spot or look for a different spot to pull into.

Example Vehicle Systems

Figure 1A:
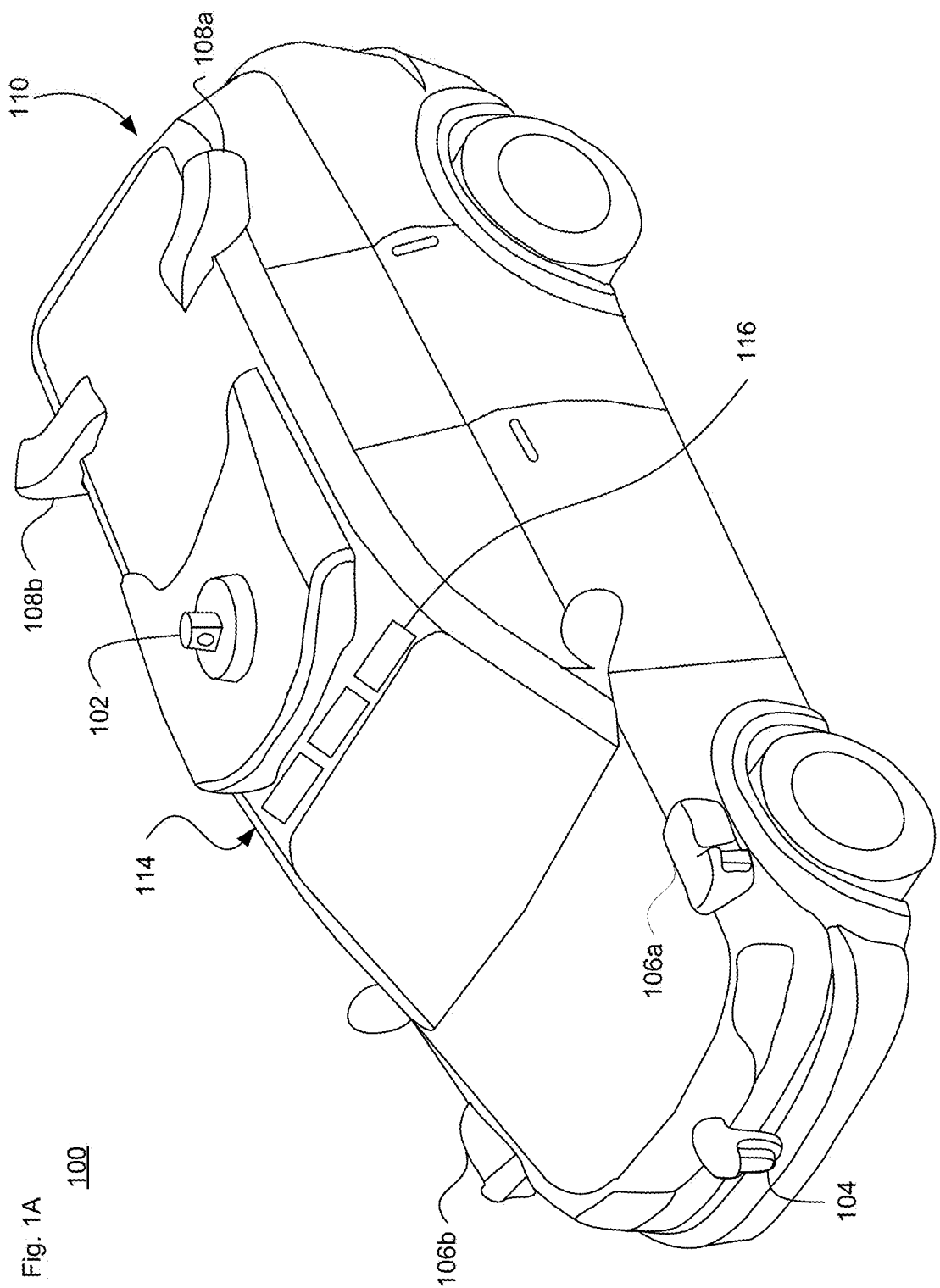

FIG. 1A illustrates a perspective view of an example passenger vehicle 100, such as a minivan, sport utility vehicle (SUV), sedan or other vehicle that may be used in accordance with aspects of the technology to pick up and drop off passengers, make food deliveries, transport packages or other cargo, etc. FIG. 1B illustrates a top-down view of the passenger vehicle 100. As shown, the passenger vehicle 100 includes various sensors for obtaining information about the vehicle's external environment, which enable the vehicle to operate in an autonomous driving mode. For instance, a roof-top housing 102 may include one or more lidar sensors as well as various cameras, radar units, infrared and/or acoustical sensors. Housing 104, located at the front end of vehicle 100, and housings 106a, 106b on the driver's and passenger's sides of the vehicle, may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (112 in FIG. 1B) may be positioned along the rear of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces (not shown).

FIGS. 1C-D illustrate an example of another type of vehicle 120, such as an articulated bus, which may be employed in accordance with aspects of the technology, such as to pick up and drop off passengers. As with the passenger vehicle 100, the articulated bus 120 may include one or more sensor units disposed along different areas of the vehicle.

By way of example, each sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle configured for self-driving in an autonomous driving mode, including, but not limited to, cars, vans, cargo trucks, motorcycles, buses, recreational vehicles, emergency vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive fully autonomously without human assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
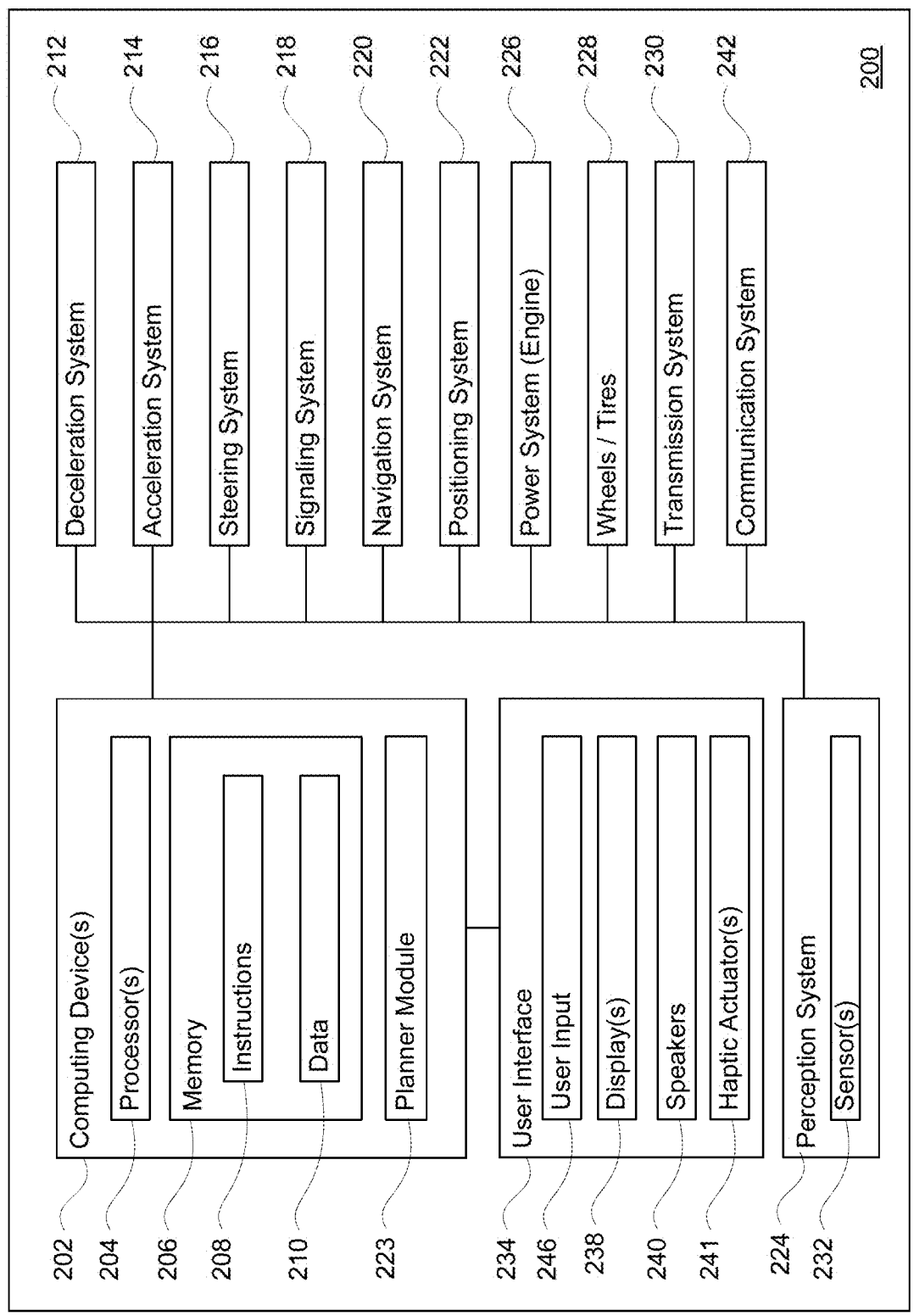
FIG. 2 is a block diagram of systems of an example vehicle in accordance with aspects of the technology.

FIG. 2 illustrates a block diagram 200 with various components and systems of an exemplary vehicle, such as passenger vehicle 100 or bus 120, to operate in an autonomous driving mode. As shown, the block diagram 200 includes a computing system having one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or obtained sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an on-board autonomous driving computing system incorporated into vehicle 100. The autonomous driving computing system is configured to communicate with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to one or more destinations, selecting a pickup and/or drop-off point or zone for each location, or for otherwise making modifications to various driving aspects in view of current or expected pickup, drop-off, traffic, weather or other conditions.

The computing devices 202 are also operatively coupled to a perception system 224 (that is configured to detect objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously without human interaction using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by sending a control signal for increasing fuel or other energy provided to the engine by acceleration system 214), decelerate (e.g., by sending a control signal for decreasing the fuel supplied to the engine, changing gears, and/or by applying brakes by deceleration system 212), change direction (e.g., by sending a control signal for turning the front or other wheels of vehicle 100 by steering system 216), and signal such changes (e.g., by causing actuation of turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may include information that identifies the shape and elevation of roadways, placement of lane markers, intersections, and/or crosswalks, roadway speed limits, the presence of traffic signal lights or signs, street lamps, buildings, driving signs (e.g., stop or yield signs), parking information (e.g., parking signage, parking meters, curb striping or pavement markings), real time traffic information, the presence of vegetation or other such objects. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

While the map information may be an image-based map, the map information need not be entirely image based (e.g., raster). For example, the map information may include one or more roadgraphs or graph networks of information such as roads, lanes, intersections, and the connections between these features. Each feature may be stored as graph data and may be associated with information such as a geographic location and whether or not it is linked to other related features. For example, a stop light, stop sign or street lamp may be linked to a road and an intersection, etc. In some examples, the associated data may include grid-based indices of a roadgraph to allow for efficient lookup of certain roadgraph features.

The perception system 224 includes sensors 232 for detecting objects external to the vehicle. The sensors 232 are located in one or more sensor units around the vehicle. The detected objects may be other vehicles, obstacles in the roadway, traffic signals, signs, trees, bicyclists, pedestrians, etc. The sensors 232 may also detect certain aspects of weather or other environmental conditions, such as snow, rain or water spray, or puddles, ice or other materials on the roadway.

By way of example only, the perception system 224 may include one or more lidar sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, use of turn or hazard signals, etc. Information obtained from the sensors may include 2D or 3D point cloud data (e.g., for radar or lidar sensors), imagery from the cameras or other optical imaging devices, sound data across one or more frequency bands, etc. Such information may be processed or otherwise evaluated separately, or combined in a sensor fusion approach to derive a unitary model or representation of the environment around the autonomous vehicle.

The perception system 224 may also include other sensors within the vehicle to detect objects and conditions within the vehicle, such as in the passenger compartment. For instance, such sensors may detect, e.g., one or more persons, pets, packages or other cargo, etc., as well as conditions within and/or outside the vehicle such as temperature, humidity, etc. This can include detecting where the rider(s) is sitting within the vehicle (e.g., front passenger seat versus second or third row seat, left side of the vehicle versus the right side, etc.). The interior sensors may detect the proximity, position and/or line of sight of the rider in relation to one or more display devices of the passenger compartment. Still further, sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely and/or to determine whether a parking spot will become available, e.g., via adjustments made by planner module 223, including adjustments in operation to deal with occlusions, congestion or other roadway issues, weather, etc.

As illustrated in FIGS. 1A-B, certain sensors of the perception system 224 may be incorporated into one or more sensor assemblies or housings. In one example, these may be integrated into the side-view mirrors on the vehicle. In another example, other sensors may be part of the roof-top housing 102, or other sensor housings or units 106*a,b*, 108*a,b*, 112 and/or 116. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. By way of example, displays may be located, e.g., along the dashboard, on the rear of the front row of seats, on a center console between the front row seats, along the doors of the vehicle, extending from an armrest, etc. Other output devices, such as speaker(s) 240 and/or haptic actuators 241 may also be located within the vehicle. There may also be one or more vehicle sound generators and/or external speakers, which may be used to communicate information to riders or other people outside the vehicle, especially at pickup. The display(s) and/or other output devices may be used to indicate to a rider the location of a drop off point or other location of interest, an estimated time until disembarking, or other relevant ride-related information.

The passenger vehicle also includes a communication system 242. For instance, the communication system 242 may also include one or more wireless configurations to facilitate communication with other computing devices, such as rider computing devices within the vehicle, computing devices external to the vehicle such as with users awaiting pickup (or delivery of a package, etc.), in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

While the components and systems of FIG. 2 are generally described in relation to a passenger vehicle arrangement, as noted above the technology may be employed with other types of vehicles, such as the bus 120 of FIGS. 1C-D. In this type of larger vehicle, the user interface elements such as displays, microphones, speakers or haptic actuators may be distributed so that each rider has their own information presentation unit and/or one or more common units that can present status information to larger groups of riders.

Example Scenarios

In view of the architectures and configurations described above and illustrated in the figures, various aspects of the technology will now be described.

A self-driving vehicle, such as a vehicle with level 4 or level 5 autonomy that can perform driving actions without human operation, has unique requirements and capabilities. This includes making driving decisions based on a planned route and pickup and drop off locations, received traffic information, objects in the external environment detected by the sensors of the vehicle's perception system, etc. Traffic congestion, legal restrictions on parking or loitering, inclement weather (e.g., heavy rain, dense fog and/or lightening) or other conditions (such as icy sidewalks, puddles, debris, work or construction zone signage, traffic barricades or safety barriers, etc.) may affect the ability of the vehicle to pick up riders or cargo (e.g., groceries or packages) at an initially selected location.

In one aspect, a user (e.g., a rider or other customer) may download an application for requesting a vehicle to a client computing device. For example, users may download the application via a link in an email, directly from a website, or an application store to their respective client computing devices, such as mobile phones, tablet PCs, laptops or wearable computers (e.g., smart watches). In response to user input, a client computing device may transmit a request for the application over the network, for example, to one or more server computing devices, and in response, receive the application. The application may be installed locally at the client computing device. The user may use the application to request a vehicle. As part of this, the user may identify a pickup location, a drop off location, or both. Any intermediate stops may also be identified (e.g., stopping off at a supermarket, bakery or dry cleaners on the way home after work). In this regard, the drop off location or any intermediate stops may be at a physically different location from an ultimate destination location.

The rider or other user may specify a pickup point, intermediate destination, and final destination locations in various ways. As an example, a pickup location can be defaulted to a current location of the user's client computing device (e.g., based on GPS or other location information for the client computing device). Alternatively, the pickup location may be a recent or saved location associated with the user's account, included in a calendar event, associated with an event such as a concert, movie or sporting event, etc. The user may enter an address or other location information (e.g., via typing or speaking the location), tap a location on a map or select a location from a list in order to identify a pickup and/or destination location.

Dispatching instructions, such as from a vehicle dispatch service, may be sent to an assigned vehicle, including the pickup location, any intermediate destination(s), and the final destination (final drop off location). Based on this, the vehicle is able to control itself in the autonomous driving mode towards the pickup location, for instance by using the various systems of the vehicle as described above, in order to initiate and complete the trip. Although the examples herein relate to transporting passengers, similar features may be used for the transportation of goods (e.g., packages or food deliveries) or other cargo.

Prior to or upon arriving at the selected location, the autonomous vehicle may identify one or more potential pullover spots. If one of the potential spots is vacant, the autonomous vehicle can enter that spot by, e.g., performing a parallel parking maneuver or pulling head-first into the spot. However, if none of the potential spots is currently free, the autonomous vehicle may evaluate the status of vehicles in those spots to determine whether one (or more) of the vehicles will be exiting from its spot shortly (e.g., in the next 30 seconds to 2 minutes, or more or less). The amount of time the autonomous vehicle may elect to wait for a spot to become available may depend on various factors, including the time until pickup, the possible availability of other spots near to the pickup location, the impact of waiting for a spot on other road users, the type of pickup (e.g., pickup of 1 passenger versus pickup of a large order of groceries), etc.

Figure 3A:
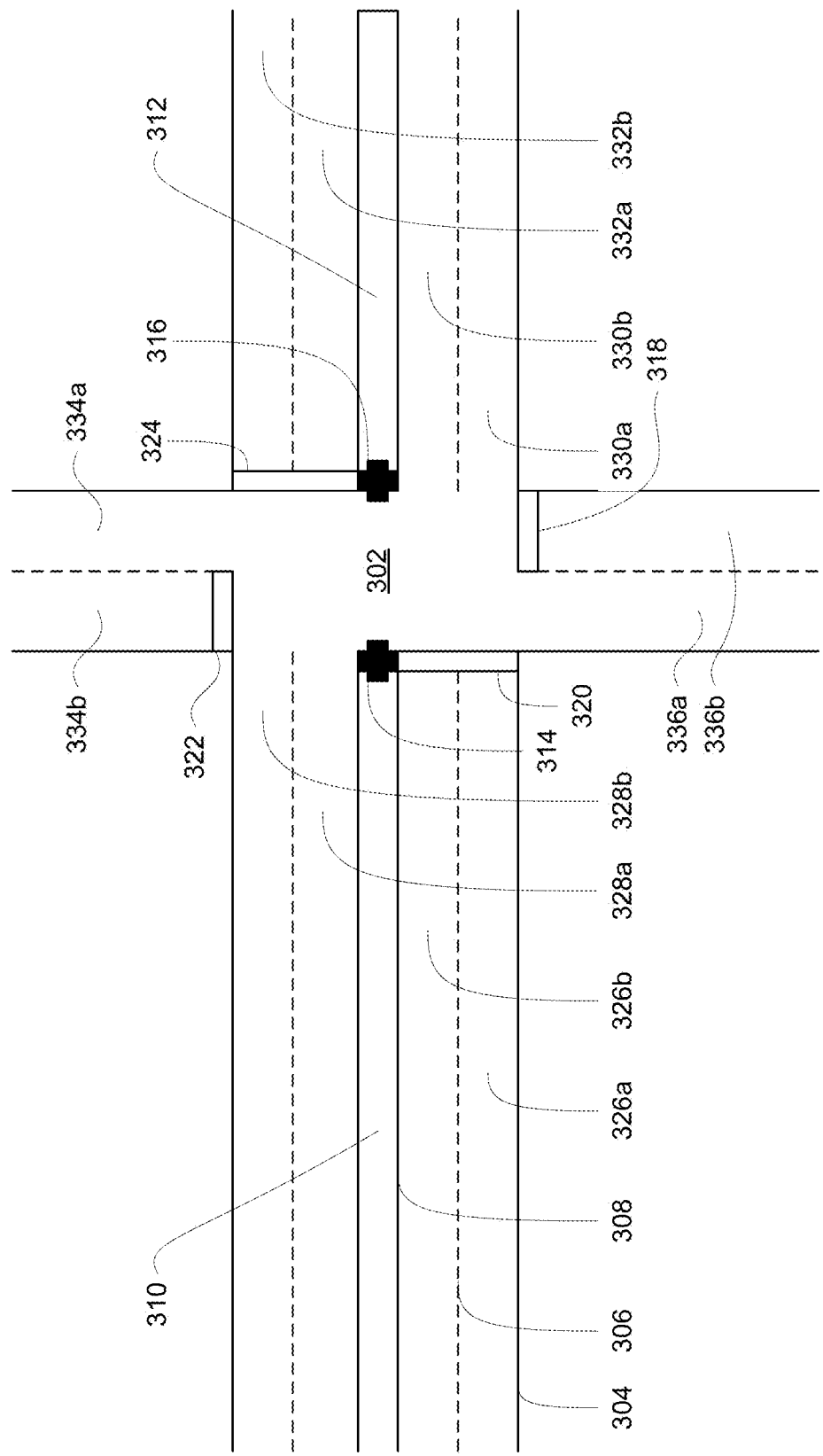
FIGS. 3A-B illustrates exemplary map information in accordance with aspects of the technology.
Figure 3B:
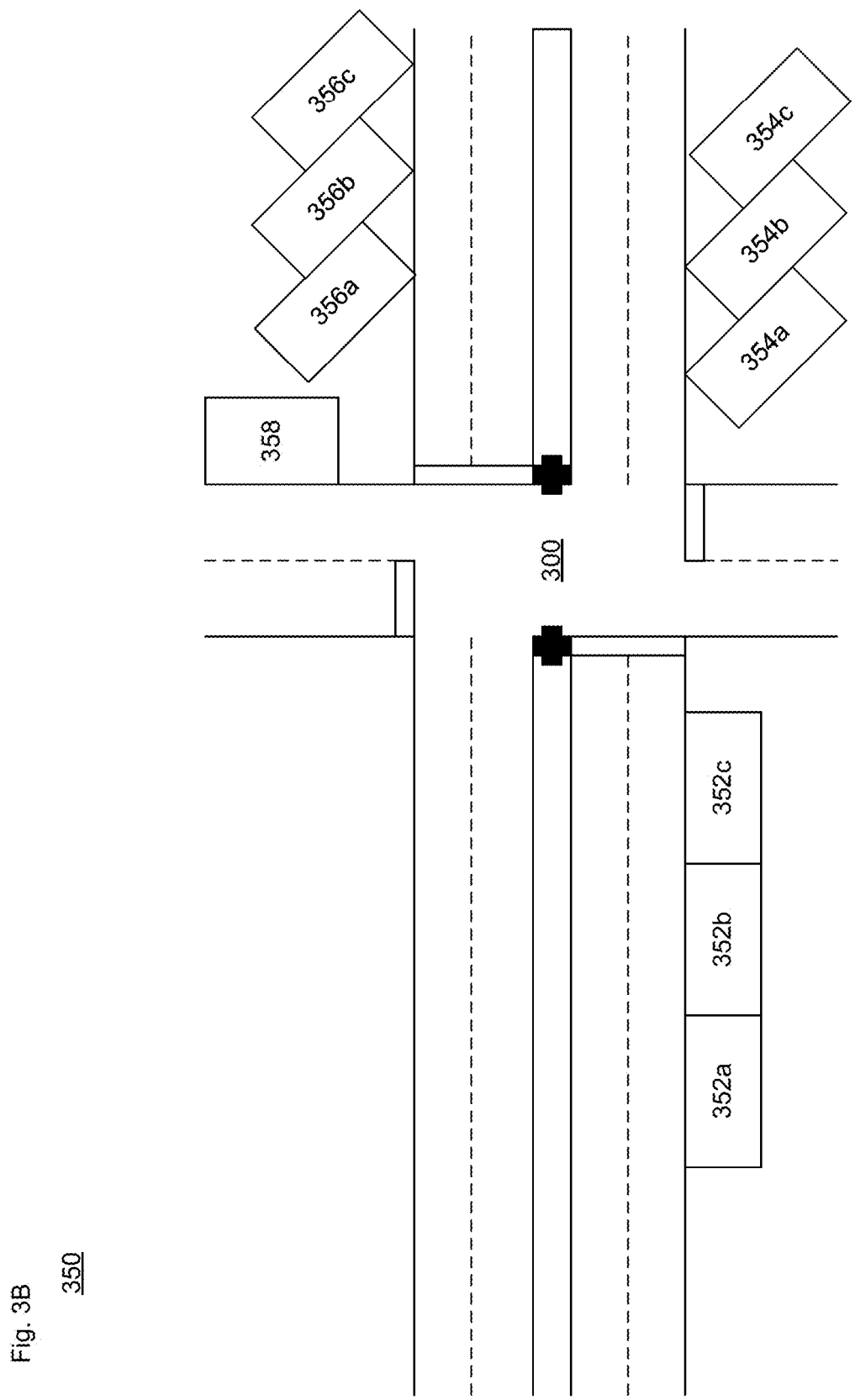

FIGS. 3A-B illustrate an example 300 of map information for a section of roadway including intersection 302. FIG. 3A depicts certain map information that includes information identifying the shape, location, and other characteristics of lane markers or lane lines 304, 306, 308, median areas 310, 312, traffic signals 314, 316, as well as stop lines 318, 320, 322, 324. The lane lines may also define various lanes (e.g., 326a-b, 328a-b, 330a-b, 332a-b, 334a-b and 336a-b) or these lanes may also be explicitly identified in the map information. In addition to these features, the map information (e.g., roadgraphs) may also include information that identifies the direction of traffic, speed limits for each lane, as well as information that allows the system to determine whether the vehicle has the right of way to complete a particular maneuver (e.g., complete a turn, change lanes, cross a lane of traffic or proceed through an intersection), as well as other features such as curbs, buildings, waterways, vegetation, signs, etc.

The map information may identify pullover locations, which may include one or more areas where a vehicle is able to stop and to pick up or drop off riders (or packages or other cargo). These areas may correspond to parking spaces, waiting areas, turn-offs, shoulders, parking lots or other places where the vehicle may wait prior to picking up the rider. For instance, FIG. 3B depicts a view 350 showing parking areas 352-358 adjacent to different portions of the roadway. In particular, in this view the parking areas 352a-c are adjacent to lane 326a, head-in parking areas 354a-c are adjacent to lane 330a, parking areas 356a-c are adjacent to lane 332b, and parking area 358 is adjacent to lane 334a).

In one scenario, these locations may correspond to parking spaces, but in other scenarios such locations may correspond to any type of area in which a vehicle is able to stop to pick up and drop off passengers or cargo, such as a loading zone or marked curb region designated for certain temporary idling or stopping activities. For instance, curb striping or other pavement markings may use a white color (or no color) to indicate parking is permitted; a blue color to indicate parking only for vehicles with disabled parking placards or license plates; a green color to indicate parking for a limited period of time (e.g., 5-15 minutes); a yellow color to indicate vehicles are permitted to pull over only to load or unload passengers; and/or a red color to indicate a no-parking zone. Signage or other indicia may also be used to indicate whether parking is permitted, how long a vehicle can park, which vehicles may park at the location, etc.

The locations may be associated with time of day, holiday, street sweeping, garbage collection or other regulations that may limit when pickups or drop offs may be performed, such as no parking when the road is snow covered. This information may be updated periodically, for instance every week (or more or less), based on locations where vehicles of the fleet or other vehicles are observed being stopped or pulled over.

FIG. 4 illustrates an example pickup situation 400. In this situation, autonomous vehicle 402 arrives at a pickup location (e.g., for the House of Pizza). While there may be one or more parking spots in front of the pickup location, in this example another vehicle, bus 404, is located at those spots when the autonomous vehicle 402 arrives. In this situation, as the autonomous vehicle 402 approaches the pickup location, the vehicle's perception system detects the presence of the other vehicle. This may include detecting the position and orientation of the vehicle along a roadway, parking spot or other location.

The perception system or another part of the vehicle's computing system (e.g., processor(s) 204) may identify what type of object the other vehicle is (e.g., a bus rather than a sedan, truck, motorcycle, emergency vehicle, construction equipment, bicyclist, pedestrian, etc.), or even a specific type of object (e.g., a food delivery vehicle rather than just a sedan or panel truck, or a tour bus rather than a school bus). This may be done, by way of example, by evaluating one or more object models stored in memory, where each object model includes a set of object features or characteristics. The set of object features or characteristics may include information about the object's overall shape and configuration (e.g., according to a static or kinematic model of the object), the number of wheels and/or doors, the presence and position of headlights, brake lights and/or emergency lights, stickers, logos signs, QR codes or other markers, sound information such as a horn honk profile or siren noises, etc. In some examples, behavior models associated with different types of objects may be included in the object models or may be separate from them. The behavior models identify one or more behaviors of interest that are associated with different objects. Here, for instance, a bus behavior may include pulling into or out of a pickup area designated as a bus stop, while a car/sedan behavior may include actuating hazard lights/flashers while temporarily stopped, performing a parallel parking operation, etc. The object and/or behavior model information may be stored in memory, such memory 206 of FIG. 2.

Estimating Departure of Another Vehicle from a Spot

Upon detecting the presence of the other vehicle 404, the vehicle 402 classifies, detects or otherwise determines whether that other vehicle is currently or will shortly be pulling out of the spot(s). This can include using a variety of signals and attributes that may be associated with the other vehicle, historical parking information, contextual information about the nearby location or the parking spot itself, etc. For instance, with regard to vehicle-related signals and attributes, this may involve detecting whether a turn signal or hazard signal is flashing and/or whether brake lights are illuminated (e.g., as detected by one or more cameras of the autonomous vehicle's perception system). The turn signals can indicate that the vehicle is temporarily pulled over (e.g., when the right turn signal is flashing and the vehicle is pulled over on the right side of a road) or will be pulling out of a spot (e.g., when the left turn signal is flashing and the vehicle is pulled over on the right side of the road).

Identifying whether the wheel angle has changed and/or whether a turn signal is flashing can also be a signal indicating the vehicle is preparing to pull out of the spot. Alternatively or additionally, whether a given door or the trunk of the other vehicle is open or closed (e.g., as detected by one or more lidar sensors or cameras of the autonomous vehicle's perception system) and/or whether brake lights are on can indicate that a passenger is entering or exiting the vehicle, or a package or other cargo is being loaded or unloaded. Other vehicle-related information may include detection of someone sitting in the driver's seat or people sitting in one or more passenger seats, or otherwise being located inside the vehicle. This can indicate that the vehicle is temporarily waiting in the spot and is likely to leave shortly (e.g., in the next 1-5 minutes).

Recently parked attributes are another vehicle-related signal. For example, if a car is in a loading zone and recently parked, the autonomous vehicle may determine not to wait for it since it is more likely than not that the car will be in the loading zone for more than a few minutes. If the car (or other vehicle) has been seen as having recently pulled into a spot, this information would weigh heavily against waiting for it to exit the spot in the near future (e.g., next 30 seconds to 2-3 minutes). However, if the car (or other vehicle) has not been seen as having pulled into the spot, the information discussed above can be used to estimate how recently the vehicle likely parked, and can then use this to determine whether the autonomous vehicle will wait for the spot.

Information about the parking/pullover area itself may be considered. This can include, for example, evaluating the size/shape or other configuration of the parking area (e.g., such as whether there are one or more spots, whether there is a pullover area adjacent to the road, whether there is a driveway present, etc.). It can also include identifying whether there is a permissible place to pull over based on signage, curb striping or pavement markings (e.g., signifying a loading zone), and/or the presence of parking meters, fire hydrants, construction/parking cones or the like.

Historical parking information associated with a particular area of interest (e.g., a particular street, a city block, a neighborhood, etc.) may be stored in a database and used to identify a likelihood of a spot being temporary. The historical information may include time of day, weekday versus weekend, holiday, street cleaning and/or weather-related details (e.g., no parking when road is snow covered). By way of example only, parking from 9 am to 5 pm may be limited to no more than 10-15 minutes, whereas there may be no time limit for parking on Sundays or holidays. The historical information may indicate how long vehicles are likely to be pulled over in loading zones or other pullover locations so that the autonomous vehicle can predict the likelihood of those vehicles leaving by a certain point in time (e.g., in the next 10-30 seconds, less than 2 minutes, etc.).

Other contextual information may be used to identify the likelihood that a spot is being used temporarily includes the type(s) of business(es) near the spot. For instance, as shown in FIG. 4, the area of interest may include a pizza parlor 406, a post office 408 and a hair salon 410. Since such types of businesses may be associated with various customer service or turnover times (e.g., 2-5 minutes for the post office, 1-30 minutes for the pizza parlor, 30-90 minutes for the hair salon, etc.), the system may estimate the likelihood of relatively short wait times for vehicles parked nearby.

Real-time observed or received data may also complement the contextual information. By way of example, as shown in FIG. 4, a person 412 may be identified as exiting the House of Pizza based on information received from onboard lidar and/or camera sensors. The sensor information may indicate that the person is walking toward or getting into another vehicle, or is walking toward the autonomous vehicle. Or, alternatively or additionally, the autonomous vehicle may receive a notification from a user device of the person 412 regarding the person's location and/or that they are ready for pickup.

Any or all of this information may be used by the computing system of the autonomous vehicle in any combination to determine whether or when another vehicle is likely to leave its spot. For instance, according to one aspect, using business information and unloading/loading signals may be particularly beneficial as they often complement one other. This could be especially useful with delivery or transport vehicles having identifiable company stickers, logos or other indicia on the vehicle. A confidence value may be associated with each signal or attribute. Certain signals and/or attributes may be complementary to one another, or otherwise be used to increase an overall confidence value associated with the likelihood that a vehicle will leave a given spot. For example, assume a car is parked in a spot and there is a person in the driver's seat, the brake lights are on and exhaust is detected to show the car is idling. By itself, this information may be used by the autonomous vehicle to classify the car as being likely to exit the spot shortly. However, coupled with contextual information such as being parked in front of the post office next to a sign that indicates 5-minute parking, the classification may identify a high likelihood (e.g., >80%) that the car will leave the spot in less than 2 minutes.

In another example, the determination that the parked vehicle is a bus may have a high confidence (e.g., >90%) that the vehicle will be exiting its spot quickly in the next minute or so. However, in this case, if received sensor information determines that the bus is a tour bus instead of a commuter bus or a school bus, then this confidence may be lowered (e.g., to between 30-50% or less) that the bus will leave that quickly. In low confidence situations, the onboard computing system can request remote assistance/rider support to provide input on whether to wait for the spot if there may be a particular benefit to waiting (e.g., there is no other location to pull over in a 3 block vicinity, or double parking is expressly not permitted).

Decision on Whether to Wait for a Pullover Spot

Once the computing system determines that another vehicle will be exiting a pullover spot, a decision can then be made on whether the autonomous vehicle should wait for that spot to become available or look for a different place to perform the pickup. For instance, real-time conditions may be used by the system to determine whether to wait. This can include evaluating whether any vehicles are behind the autonomous vehicle, how far behind they are (e.g., 30 meters versus 150 meters), how many driving lanes are available (e.g., for other road users to pass the waiting autonomous vehicle), how long the autonomous vehicle would need to wait for the pullover spot, etc.

While the planner module may determine whether a planned pullover location by itself would inconvenience traffic, it may also evaluate inconvenience to other road users for the location where the autonomous vehicle would wait for the pullover location to become available. Inconvenience may include the potential to create additional traffic or otherwise delay another vehicle's progress along a section of the roadway, make it harder for the other vehicle to change lanes or pull out of a spot, etc. Evaluating this based on real-time driving conditions may include analyzing signals for traffic in the nearby environment (e.g., within a 1-2 block radius), as well as planned intent trajectories for nearby vehicles (e.g., any vehicles within 100 meters behind the autonomous vehicle). The intent trajectories for nearby vehicles may include whether a following car will stay in the same lane as the autonomous vehicle, as well as the relative speed of the following car. How quickly the following car can stop or change lanes may be factors as well, which may depend on the presence (or absence) of other road users, weather conditions and other factors.

In one scenario, inconvenience to other road users may be quantified on a scale of, e.g., 1-5 with 1 being the least amount of inconvenience (e.g., another road user has sufficient time and warning to go around the waiting autonomous vehicle with minimal delay) and 5 being the greatest inconvenience (e.g., the other road user would become stuck behind the waiting autonomous vehicle for more than 5-10 seconds, or would not be able to make it through an intersection before the light turns red). Alternatively, inconvenience could be measured in a range of 0.0 (no inconvenience) to 1.0 (maximum inconvenience) or some other quantifiable measure (e.g., no inconvenience, low inconvenience and high inconvenience). One consideration for the inconvenience evaluation is whether the autonomous vehicle would need to double park for some period of time before it is able to pull into a vacated space.

Figure 5:
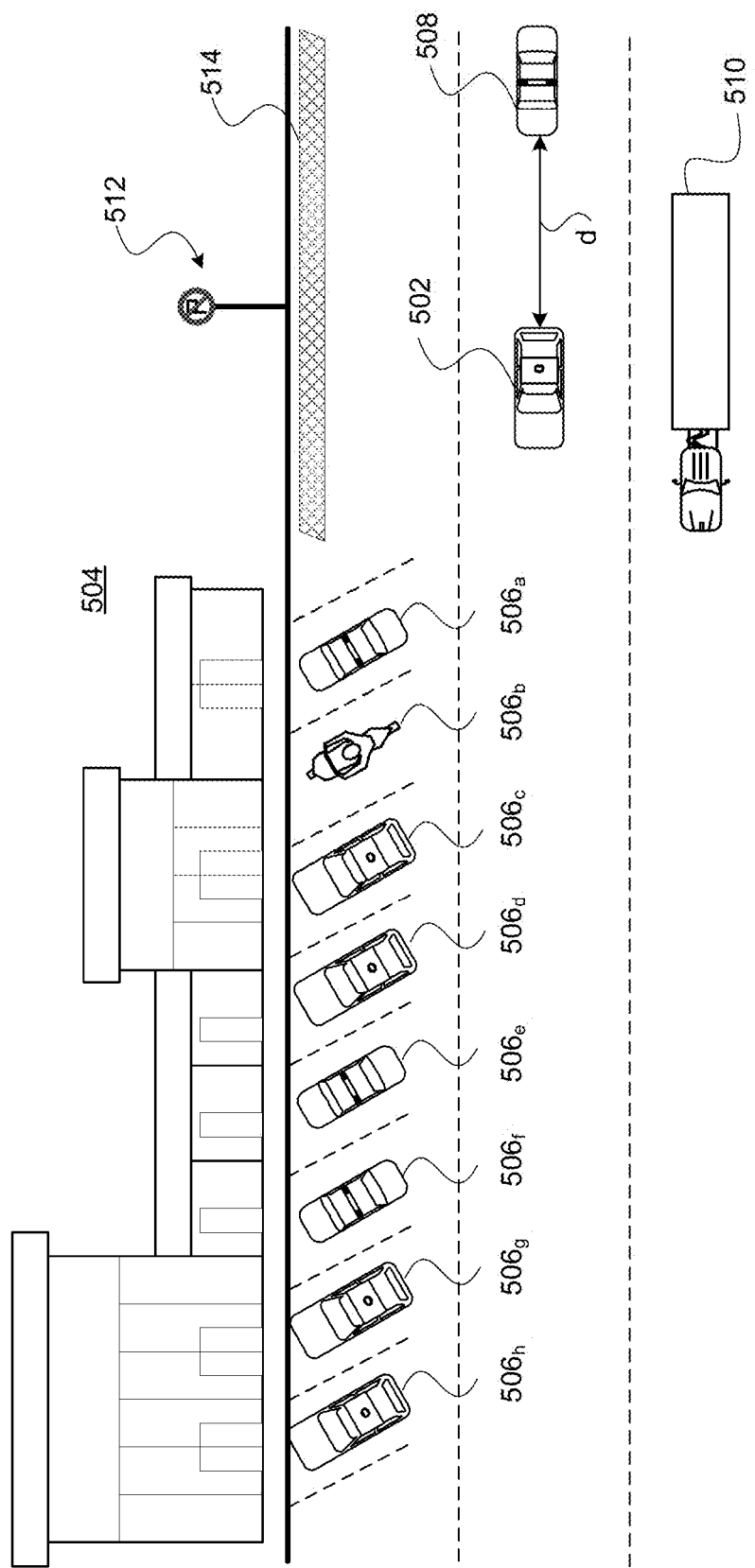
FIG. 5 illustrate an example for waiting for a pickup spot in accordance with aspects of the technology.

FIG. 5 illustrates an example 500 on deciding whether to wait for a spot. In this example, autonomous vehicle 502 approaches a set of stores 504, for instance to pick up a rider, a package or a food delivery. As shown, a number of vehicles 506 are parked in front of the stores 504. The autonomous vehicle 504 may determine that vehicle $506_b$, a motorcycle, will be leaving its spot shortly. For instance, the sensors of autonomous vehicle 502 may identify a person on the motorcycle $506b$, which may also have its brake light illuminated. Accordingly, the computing system of the autonomous vehicle 502 may determine that there is a high likelihood (e.g., 70%-80% or higher) that the motorcycle will exit its spot in the next 15-30 seconds.

The inconvenience to other road users can be evaluated by the planner module or other portion of the onboard computing system either alone or in conjunction with other driving factors (e.g., optimal path routing) when determining whether to preposition the autonomous vehicle 502 in order to enter the spot once the motorcycle vacates it. One factor in the inconvenience analysis is the presence of other vehicles along the roadway, such as sedan 508 and truck 510. In this example, the sedan 508 is following behind in the same lane as vehicle 502, while the truck 510 is in an adjacent lane. Because the truck is in a different lane and is at least partly ahead of the vehicle 502, inconvenience to the truck may be rated very low (e.g., 5%) or nonexistent (no inconvenience). In contrast, for sedan 508, because it is in the same lane following the vehicle 502, there will likely be some inconvenience. Here, the distance (d) between the sedan 508 and the vehicle 502 is one factor, and the relative speed between them is another factor. In addition, due to the presence of no-parking sign 512 and/or curb striping 514 indicating a no-parking zone, in this example the vehicle 502 would need to double park in order to wait for the motorcycle to exit the spot.

Figure 6:
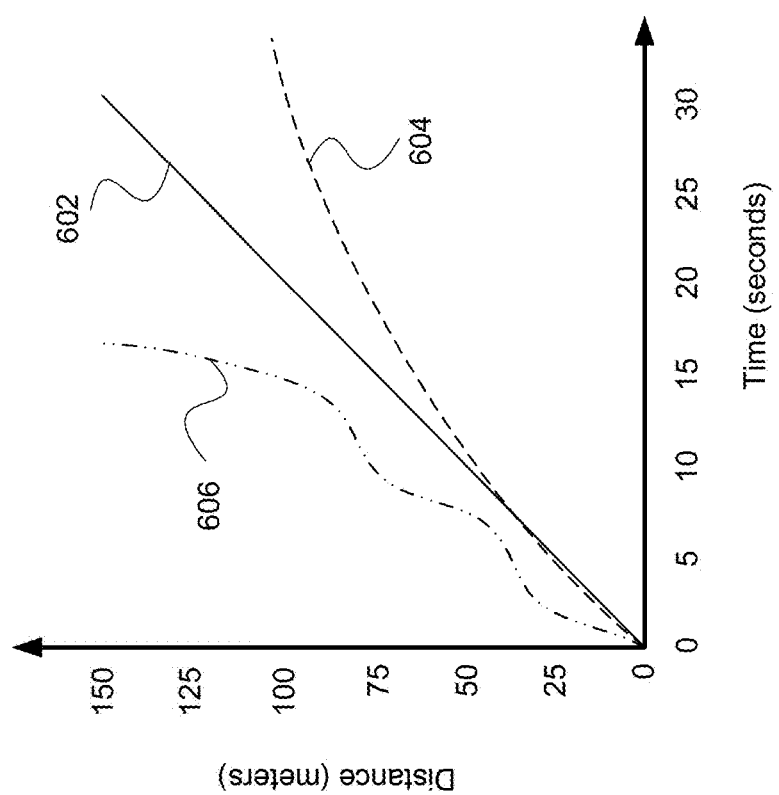
FIG. 6 illustrates plots showing examples of how long to wait for a spot in accordance with aspects of the technology.

FIG. 6 illustrates a chart 600 showing different time-distance plots for how long the vehicle 502 could preposition itself in a double-parked location waiting for the motorcycle to leave. In one example, plot 602 shows a linear relationship between the maximum wait time (e.g., 30 seconds) and the distance between vehicle 502 and the approaching sedan. In another example, plot 604 shows that the wait time may be extended for the same distance (relative to plot 602), for instance if there are no other vehicles in the adjacent lane and the relative speed between vehicle 502 and the sedan is below a threshold (e.g., below 20 miles per hour or below about 9 m/s). And plot 606 shows yet another example, where the maximum wait time may be reduced or otherwise variable for the same distance (relative to plot 602), for instance if there are several other vehicles traveling along the roadway and/or the relative speed between vehicle 502 and the sedan exceeds the threshold.

While FIG. 5 illustrates one example, there may be many other scenarios for deciding whether to wait for a spot. For instance, the autonomous vehicle may approach a pullover scene where it will need to double park while waiting for a spot to open up. How long until the planned ETA for a pickup can be a factor to evaluate. By way of example, if the vehicle arrives 2 minutes ahead of the planned ETA, there may be sufficient time to (i) drive slowly without double parking, (ii) drive around the corner to look for a currently open space, or (iii) circle the block to minimize the time until the planned ETA. As the vehicle's sensors scan the scene in the external environment so the planner module can determine whether the vehicle should double park, the computing system may accurately detect that another vehicle is leaving its pullover spot. In this case, the system may assign an estimation of how long waiting for the spot and pulling into it will take. If this estimate is less than the planned ETA, the planner module may determine to double park and wait for the spot. In this example, double parking may be weighted more heavily than other factors (e.g., closeness of the spot to the planned pickup location).

Thus, when there is a possibility that more than one spot will become available shortly (e.g., in the next 10-60 seconds), the planner module may choose to double park and wait for the spot most likely to become available first. The planner module or another part of the computing system may then control the signaling system to turn on a blinker and the steering and deceleration systems to pre-position the vehicle in the double-parked location, so that the vehicle can pull into the spot once it opens up. In addition, the vehicle may signal to a rider or other user, via a client device app and/or the vehicle's signaling system, that the vehicle is waiting to pull into the spot. Here, if the rider arrives on the scene earlier than the planned ETA, the pull-in may be cancelled with the rider being picked up at the double-parked location.

In another scenario, the autonomous vehicle may choose to initially park in a spot that is at a first distance from the planned pickup location. Here, the vehicle may use its sensors to scan for other vehicles parked in spots that are closer or otherwise more convenient (e.g., on the same side of the street) to the pickup location, in order to determine whether to move from the initial parking spot. Such potential micro-location adjustments may involve the same evaluation and factors as discussed above, including whether the autonomous vehicle would double park while waiting for the other, more convenient spot.

In the scenario of examples 500, there were preconfigured parking spaces in front of the row of stores 504. However, other scenarios may not include preconfigured or otherwise delineated parking spaces. In an alternative scenario shown in example 700 of FIG. 7, an autonomous vehicle 702 is approaching a pickup location 704, such as a mall, airport or train terminal. Here, a loading and/or unloading zone 706 is provided. The zone 706 may allow for one or more vehicles to pull up to let off or pick up riders. In this case, the zone 706 may be designed for quick pickups and drop offs. Unlike the earlier examples, the factors evaluated by the onboard computing system may be somewhat different in that it may be assumed that a spot will open up along zone 706 relatively quickly (e.g., in the next 20-60 seconds), but it may be less clear which vehicle 708 will be pulling out of the zone first. Thus, in this case, the system may weight vehicle-related signals more heavily than other signals/factors, or may rely solely on vehicle-related signals to the exclusion of other factors. By way of example, whether the doors and trunk of a given vehicle are all closed, whether a turn signal or hazard signal is flashing, and/or the orientation of the front wheels of the given vehicle may be the most relevant signals to indicate that that particular vehicle is preparing to depart from the pickup/drop-off zone.

Figure 8B:
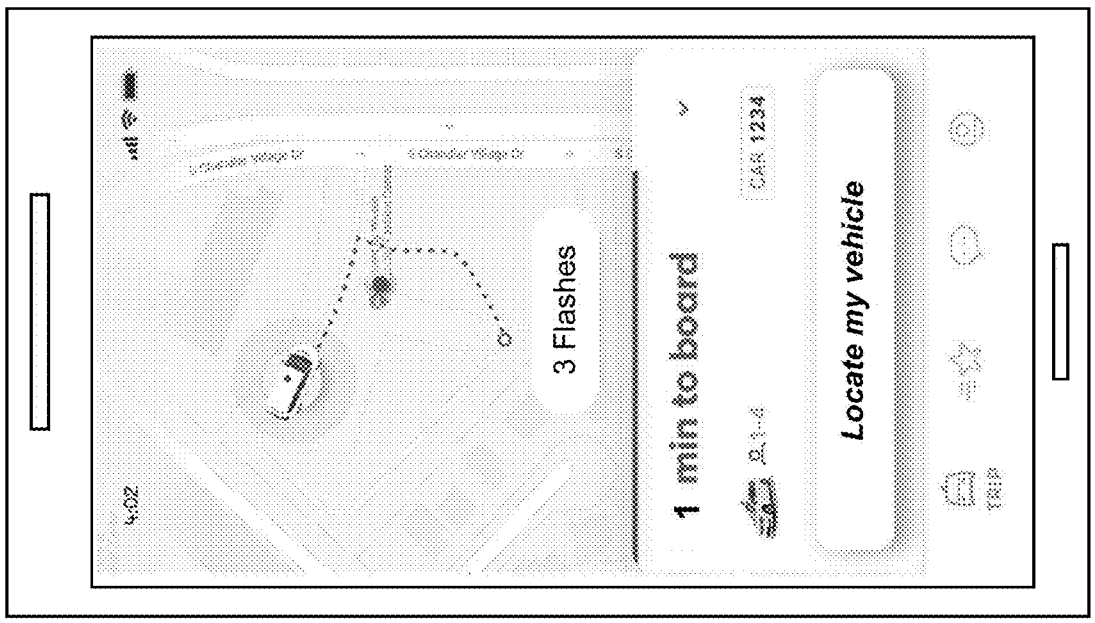
FIGS. 8A-B illustrate a user device interface presenting pickup-related information in accordance with aspects of the technology.
Figure 8A:
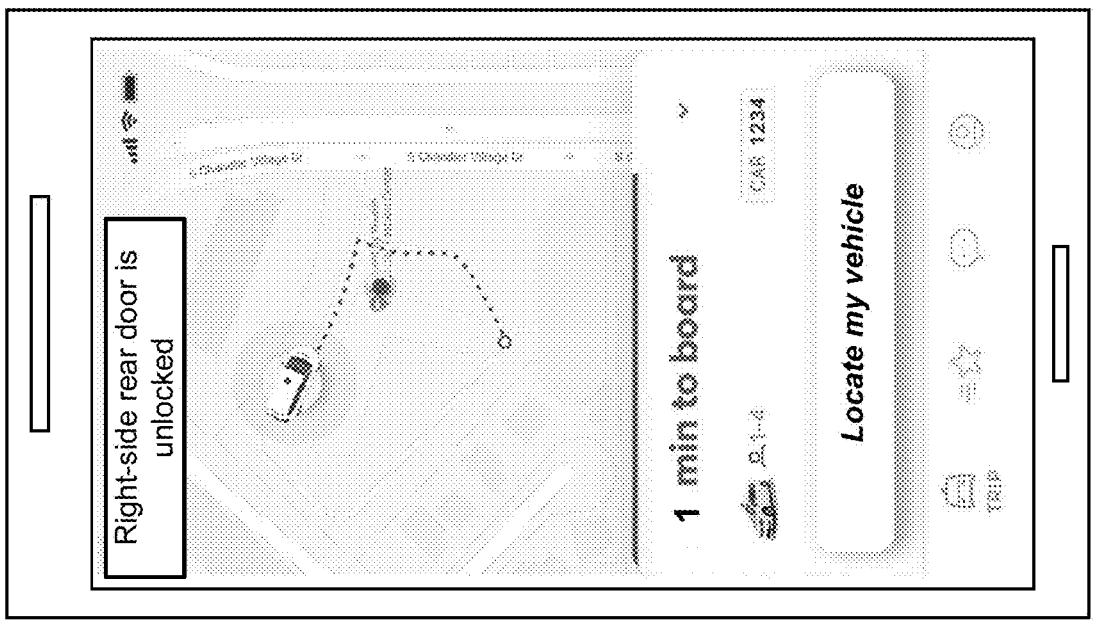

A notification may also be provided to the rider's client computing device indicating how to find the vehicle, which door to enter, and/or other useful information to streamline the pickup. FIG. 8A illustrates an example 800 indicating that the right-side rear door of the vehicle is unlocked, and also indicates a dotted path that the rider could follow to access that door. FIG. 8B illustrates another example 810, in which visual cues by the vehicle (e.g., 3 flashes of the headlights) are noted to the rider so that the correct vehicle can be easily identified.

In one implementation, the pickup-related information that is transmitted to the user's personal device originates from the vehicle. For instance, the pickup location and other status information may be identified by the planner module or other part of the onboard processing system. This information may be communicated directly (e.g., via a WiFi connection, Bluetooth ad hoc link or the like) or routed through a remote server (e.g., via a cellular communication link), for instance as part of a fleet management system (see, e.g., FIGS. 9A-B, which are discussed further below). In one scenario, the server may decide whether to message the user and how to message the user. In another scenario, the vehicle and the server can both transmit status information to the user's device. This may be done in collaboration between the vehicle and the server, or independently.

Figure 9A:
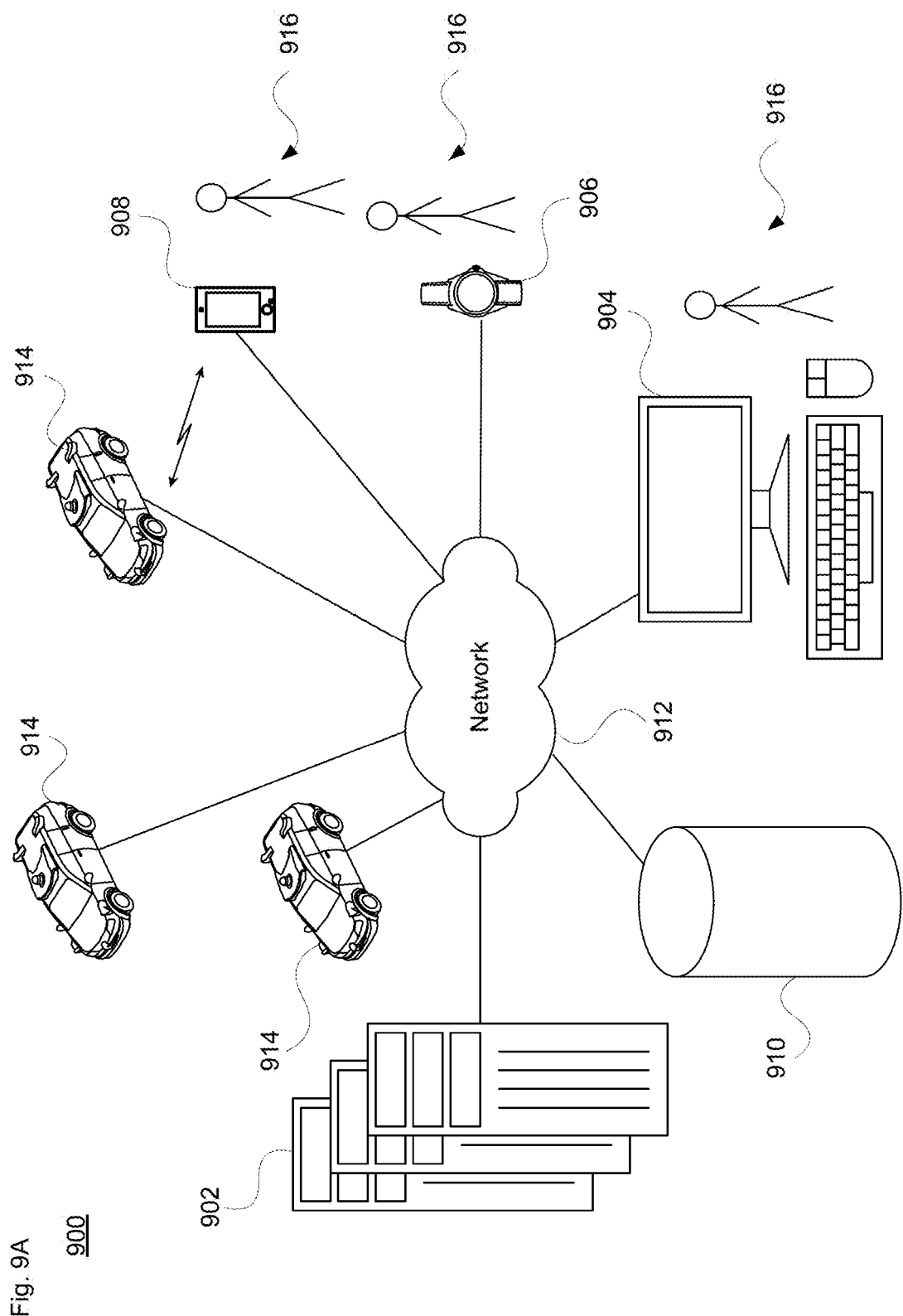
FIGS. 9A-B illustrate a system in accordance with aspects of the technology.
Figure 9B:
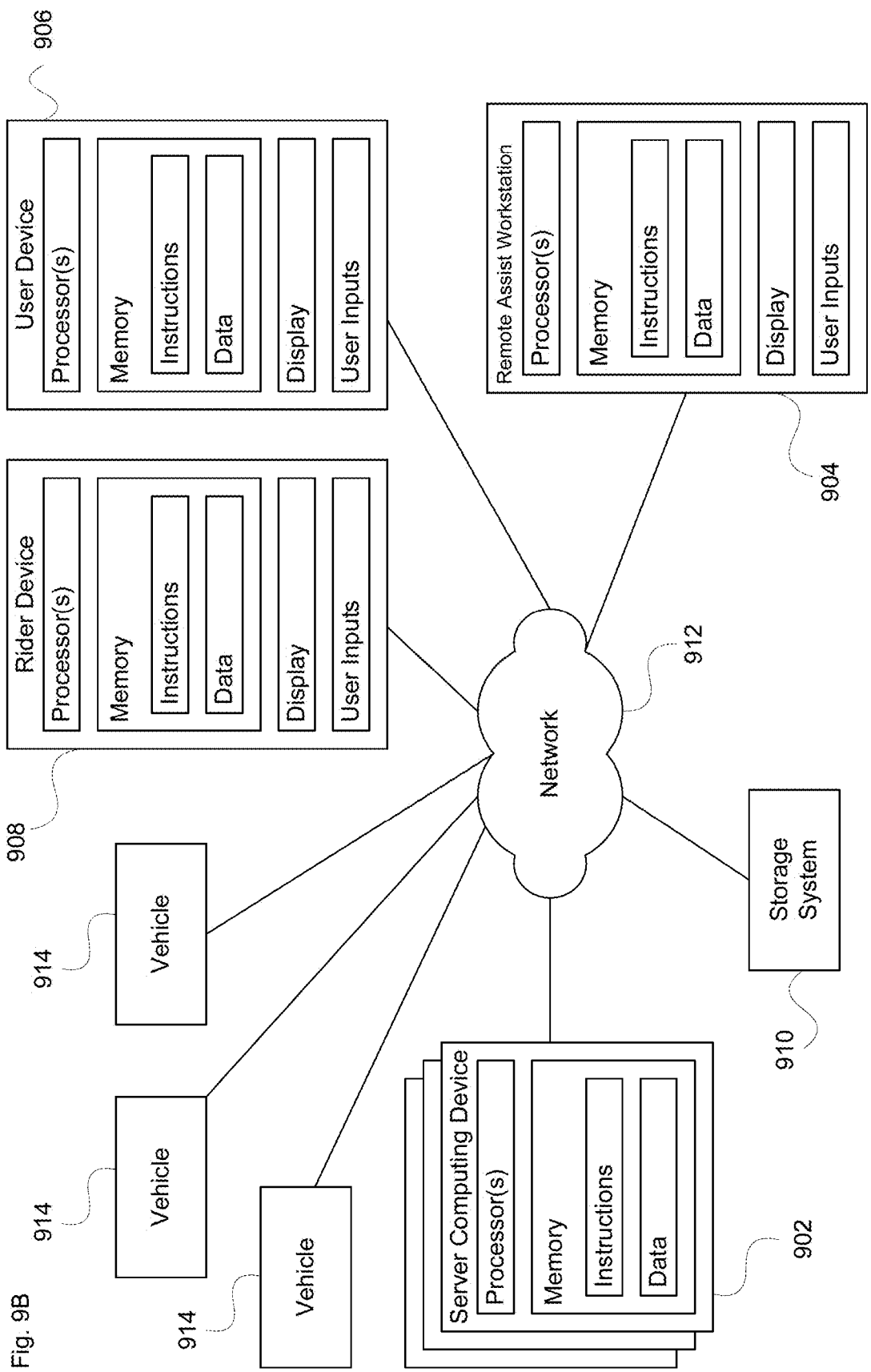

FIGS. 9A-B illustrate general examples of how information may be communicated between the autonomous vehicle and the rider or other user. In particular, FIGS. 9A and 9B are pictorial and functional diagrams, respectively, of an example system 900 that includes a plurality of computing devices 902, 904, 906, 908 and a storage system 910 connected via a network 912. System 900 also includes vehicles 914, which may be configured the same as or similarly to vehicles 100 and 120 of FIGS. 1A-B and 1C-D, respectively. Vehicles 914 may be part of a fleet of vehicles. Although only a few vehicles and computing devices are depicted for simplicity, a typical system may include significantly more.

As shown in FIG. 9B, each of computing devices 902, 904, 906 and 908 may include one or more processors, memory, data and instructions. Such processors, memories, data and instructions may be configured similarly to the ones described above with regard to FIG. 2. The various computing devices and vehicles may communication via one or more networks, such as network 912. The network 912, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 902 may include one or more server computing devices having a plurality of computing devices, e.g., a load balanced server farm, that exchange information with different nodes of a network for the purpose of receiving, processing and transmitting the data to and from other computing devices. For instance, computing device 902 may include one or more server computing devices that are capable of communicating with the computing devices of vehicles 914, as well as computing devices 904, 906 and 908 via the network 912. For example, vehicles 914 may be a part of a fleet of vehicles that can be dispatched by a server computing device to various locations for pickups. In this regard, the computing device 902 may function as a dispatching server computing system which can be used to dispatch vehicles to different locations in order to pick up and drop off riders or to pick up and deliver packages or other cargo such as groceries. In addition, server computing device 902 may use network 912 to transmit and present information to a user of one of the other computing devices or a rider of a vehicle. In this regard, computing devices 904, 906 and 908 may be considered client computing devices.

As shown in FIG. 9A each client computing device 904, 906 and 908 may be a personal computing device intended for use by a respective user 916, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone and/or hands-free sensors such as mm-wave sensors). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 906 and 908 may be mobile phones or devices such as a wireless-enabled PDA, a tablet PC, a wearable computing device (e.g., a smartwatch, smart glasses or smart clothing), or a netbook that is capable of obtaining information via the Internet or other networks.

In some examples, client computing device 904 may be a remote assistance workstation used by an administrator or operator to communicate with riders of dispatched vehicles, or users awaiting pickup. For instance, in a low confidence situation, the onboard computing system can request remote support via client computing device 904 to provide guidance on whether to wait for the spot. This may be particularly helpful if there is a demonstrable benefit to waiting (e.g., it would take too long to go to another pullover spot, any other pullover spots would inconvenience the rider or make a delivery pickup challenging, etc.). Although only a single remote assistance workstation 904 is shown in FIGS. 9A-B, any number of such workstations may be included in a given system. Moreover, although workstation 904 is depicted as a desktop-type computer, the workstation 904 may include various types of personal computing devices such as laptops, netbooks, tablet computers, etc.

Storage system 910 can be of any type of computerized storage capable of storing information accessible by the server computing devices 902, such as a hard-drive, memory card, ROM, RAM, DVD, CD-ROM, flash drive and/or tape drive. In addition, storage system 910 may include a distributed storage system where data (e.g., vehicle model data, historical pullover information, etc.) is stored on a plurality of different storage devices which may be physically located at the same or different geographic locations. Storage system 910 may be connected to the computing devices via the network 912 as shown in FIGS. 9A-B, and/or may be directly connected to or incorporated into any of the computing devices.

In a situation where there are one or more riders, the vehicle or remote assistance may communicate directly or indirectly with the rider client computing device(s). Here, for example, information may be provided to the riders regarding current driving operations, changes to the route in response to the current situation (e.g., traffic), pickup and/or drop off locations, etc. As explained above, information may be passed from the vehicle to the rider or other user. For instance, when the rider is awaiting pickup, the vehicle may send pickup information via network 912. However, when the vehicle arrives at the pickup location or the rider enters the vehicle, the vehicle may communicate directly with the user's device, e.g., via a Bluetooth™ or NFC communication link.

FIG. 10 illustrates a method 1000, in accordance with the foregoing. At block 1002, the method includes identifying one or more potential pullover locations adjacent to an area of interest that the vehicle is approaching. Then at block 1004 the method includes detecting, using one or more sensors of a perception system of the vehicle, that a given one of the one or more potential pullover locations is occupied by another vehicle. At block 1006, the method includes determining whether the other vehicle will be vacating the given pullover location within a selected amount of time. At block 1008, upon determining that the other vehicle will be vacating the given potential pullover location within the selected amount of time, the method includes determining whether to wait for the other vehicle to vacate the given pullover location. And at block 1010, the method includes causing (in an autonomous driving mode) a driving system of the vehicle to either perform a first action in order to wait for the other vehicle to vacate the given pullover location or perform a second action that is different from the first action when it is determined to not wait.

Finally, as noted above, the technology is applicable for various types of vehicles, including passenger cars, buses, RVs, delivery trucks or other cargo vehicles, emergency vehicles, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A computer-implemented method for a vehicle operating in an autonomous driving mode, the method comprising:
   identifying, by one or more processors of the vehicle, one or more potential pullover locations adjacent to an area of interest that the vehicle is approaching;
   detecting, using one or more sensors of a perception system of the vehicle, that a given one of the one or more potential pullover locations is occupied by another vehicle;
   determining, by the one or more processors, a likelihood that the other vehicle will vacate the given potential pullover location within a selected amount of time subsequent to detecting that the given potential pullover location is occupied by the other vehicle, wherein determining the likelihood is based at least on contextual information including business type information for one or more businesses located within a selected distance from the given potential pullover location;
   determining, by the one or more processors according to the likelihood, whether to wait or not to wait for the other vehicle to vacate the given potential pullover location; and
   the one or more processors causing a driving system of the vehicle to either, responsive to determining to wait for the other vehicle to vacate the given potential pullover location, perform a first action to wait for the other vehicle to vacate the given potential pullover location or, responsive to determining not to wait for the other vehicle to vacate the given potential pullover location, perform a second action that is different from the first action.

2. The method of claim 1, wherein determining the likelihood is further based on one or more vehicle-related signals and at least one of: a recently parked attribute of the other vehicle, information about the one or more potential pullover locations, historical parking information for the area of interest, or contextual information associated with local real-time data.

3. The method of claim 2, wherein the one or more vehicle-related signals are selected from the group consisting of: actuation of a turn signal, actuation of a hazard signal, illumination of a brake light, a wheel angle, whether a door of the other vehicle is open, whether a trunk of the other vehicle is open, whether a person is sitting in a driver's seat of the other vehicle, and whether a passenger is present in the other vehicle.

4. The method of claim 2, wherein the information about the one or more potential pullover locations includes at least one of a configuration of the one or more potential pullover locations, parking signage, curb striping, parking pavement markings, presence of a parking meter, or presence of one or more construction or parking cones.

5. The method of claim 2, wherein the historical parking information for the area of interest includes at least one of time of day parking information, weekday parking restrictions weekend parking restrictions, holiday parking information, street cleaning information, or weather-related parking information.

6. The method of claim 2, wherein the contextual information associated with local real-time data includes whether a person is approaching the other vehicle in the given potential pullover location.

7. The method of claim 1, wherein determining the likelihood includes assigning confidence values with different signals or attributes associated with either the other vehicle or the given potential pullover location.

8. The method of claim 7, further comprising adjusting an overall confidence that the other vehicle is likely to vacate the given potential pullover location based on whether two or more signals or attributes are complementary to one another.

9. The method of claim 1, wherein determining whether to wait or not to wait for the other vehicle to vacate the given potential pullover location includes evaluating at least one of a time until the vehicle is scheduled to make a pickup, a maximum wait time, whether another parking spot is currently available, whether another parking spot will become available within a given amount of time, or an impact on one or more other road users.

10. The method of claim 9, wherein the impact on one or more other road users includes an evaluation of inconvenience to the one or more other road users.

11. The method of claim 1, wherein determining whether to wait or not to wait for the other vehicle to vacate the given potential pullover location includes identifying a maximum wait time based on a distance between the vehicle and another road user.

12. The method of claim 11, further comprising adjusting the maximum wait time based on whether the other road user is in a same lane as the vehicle or a relative speed between the other road user and the vehicle.

13. The method of claim 1, wherein the one or more potential pullover locations comprise a set of parking spots.

14. The method of claim 1, wherein the one or more potential pullover locations comprise a loading zone or an unloading zone.

15. The method of claim 1, wherein determining whether to wait or not to wait for the other vehicle to vacate the given potential pullover location includes determining whether waiting for the other vehicle to vacate the given potential pullover location will cause a delay in a progress of a different vehicle along a section of a roadway.

16. The method of claim 1, wherein determining whether to wait or not to wait for the other vehicle to vacate the given potential pullover location includes determining whether waiting for the other vehicle to vacate the given potential pullover location will impede the other vehicle vacating the given potential pullover location.

17. The method of claim 1, wherein determining whether to wait for the other vehicle to vacate the given potential pullover location includes determining whether one or more different vehicles are along a roadway near the vehicle and the other vehicle.

18. A vehicle configured to operate in an autonomous driving mode, the vehicle comprising:
- a perception system including one or more sensors, the one or more sensors being configured to receive sensor data associated with objects in an external environment of the vehicle;
- a driving system including a steering subsystem, an acceleration subsystem and a deceleration subsystem to control driving of the vehicle;
- a positioning system configured to determine a current position of the vehicle; and
- a control system including one or more processors, the control system operatively coupled to the driving system, the perception system and the positioning system, the control system being configured to:
  - identify one or more potential pullover locations adjacent to an area of interest that the vehicle is approaching;
  - identify, based on signals from the one or more sensors of the perception system, that a given one of the one or more potential pullover locations is occupied by another vehicle;
  - determine a likelihood that the other vehicle will vacate the given potential pullover location within a selected amount of time subsequent to identification of the other vehicle, wherein the determination of the likelihood is based at least on contextual information including business type information for one or more businesses located within a selected distance from the given potential pullover location;
  - determine, according to the likelihood, whether to wait or not to wait for the other vehicle to vacate the given potential pullover location;
  - responsive to a determination to wait for the other vehicle to vacate the given potential pullover location, cause the driving system of the vehicle to perform a first action to wait for the other vehicle to vacate the given potential pullover location; and
  - responsive to a determination not to wait for the other vehicle to vacate the given potential pullover location, cause the driving system of the vehicle to perform a second action that is different from the first action.

19. The vehicle of claim 18, wherein the determination of the likelihood is further based on one or more vehicle-related signals and at least one of: a recently parked attribute of the other vehicle, information about the one or more potential pullover locations, historical parking information for the area of interest, or contextual information associated with local real-time data.

20. The vehicle of claim 18, wherein the determination of the likelihood includes assignment of confidence values with different signals or attributes associated with either the other vehicle or the given potential pullover location.

21. The vehicle of claim 18, wherein the determination of whether to wait or not to wait for the other vehicle to vacate the given potential pullover location includes an evaluation of at least one of a time until the vehicle is scheduled to make a pickup, a maximum wait time, whether another parking spot is currently available, whether another parking spot will become available within a given amount of time, or an impact on one or more other road users.

22. The vehicle of claim 18, wherein the determination of whether to wait or not to wait for the other vehicle to vacate the given potential pullover location includes an identification of a maximum wait time based on a distance between the vehicle and another road user.

23. The method of claim 15, wherein determining whether waiting for the other vehicle to vacate the given potential pullover location will cause the delay in the progress of the different vehicle along the section of the roadway includes evaluating at least one of one or more signals for traffic in a nearby environment of the vehicle and a planned intent trajectory of the different vehicle.

* * * * *